US012665122B2

(12) United States Patent
Wanstall et al.

(10) Patent No.: US 12,665,122 B2
(45) Date of Patent: Jun. 23, 2026

(54) COIL ARRANGEMENT FOR A FLOWMETER AND METHOD OF MANUFACTURING A COIL ARRANGEMENT

(71) Applicant: KROHNE AG, Basel (CH)

(72) Inventors: Alex Wanstall, Northampton (GB); James Blackmore, Wollaston (GB)

(73) Assignee: Krohne AG, Basel (CH)

( * ) Notice: Subject to any disclaimer, the term of this patent is extended or adjusted under 35 U.S.C. 154(b) by 465 days.

(21) Appl. No.: 18/296,802

(22) Filed: Apr. 6, 2023

(65) Prior Publication Data

US 2023/0411064 A1     Dec. 21, 2023

(30) Foreign Application Priority Data

Apr. 7, 2022     (DE) ..................... 10 2022 108 431.0

(51) Int. Cl.
H01F 27/28          (2006.01)
B33Y 10/00          (2015.01)
(Continued)

(52) U.S. Cl.
CPC .............. H01F 27/28 (2013.01); B33Y 80/00 (2014.12); G01F 1/586 (2013.01); G01F 1/8422 (2013.01);
(Continued)

(58) Field of Classification Search
CPC .......... H01F 27/28; H01F 27/02; H01F 41/06; H01F 5/02; H01F 41/04; G01F 1/586;
(Continued)

(56) References Cited

U.S. PATENT DOCUMENTS 4,716,649 A     1/1988   Bittner et al.
6,286,373 B1 *  9/2001   Lister .................... G01F 1/8422
                                                              73/861.355
(Continued)

FOREIGN PATENT DOCUMENTS

DE            10312796 A1     9/2004
DE        102017207663 A1     11/2018
(Continued)

OTHER PUBLICATIONS

Wikipedia, "3D-Druck", XP055579281, retrieved from Internet: https://de.wikipedia.org/w/index.php?title=3D-Druck&oldid= 162016514 on Apr. 9, 2019.

*Primary Examiner* — Peter J Macchiarolo
*Assistant Examiner* — John M Royston
(74) *Attorney, Agent, or Firm* — Muncy, Geissler, Olds & Lowe, P.C.

(57)          ABSTRACT

A coil arrangement for a flowmeter, in particular a Coriolis flowmeter or a magnetic-inductive flowmeter, having a coil, wherein the coil has a coil body and has at least one coil winding made of an electrically conductive material. The object of providing a coil arrangement that has an advantageous design in comparison to the coil arrangements known from the prior art is achieved in that the coil body is made of a ceramic material and that the coil body is produced by means of an additive manufacturing process. In addition, the invention relates to a flowmeter having a respective coil arrangement as well as a method for manufacturing such a coil arrangement.

19 Claims, 7 Drawing Sheets

(51) Int. Cl.

| | |
|---|---|
| *B33Y 80/00* | (2015.01) |
| *C04B 35/622* | (2006.01) |
| *G01F 1/58* | (2006.01) |
| *G01F 1/84* | (2006.01) |
| *H01F 5/02* | (2006.01) |
| *H01F 27/02* | (2006.01) |
| *H01F 41/04* | (2006.01) |
| *H01F 41/06* | (2016.01) |

(52) U.S. Cl.
CPC ............. *H01F 27/02* (2013.01); *H01F 41/06* (2013.01); *B33Y 10/00* (2014.12); *C04B 35/622* (2013.01); *C04B 2235/6026* (2013.01); *H01F 5/02* (2013.01); *H01F 41/04* (2013.01)

(58) Field of Classification Search
CPC ................... G01F 1/8422; G01F 15/00; C04B 2235/6026; C04B 35/622; B33Y 80/00; B33Y 10/00
USPC ...................................................... 73/861.11
See application file for complete search history.

(56) References Cited

U.S. PATENT DOCUMENTS

| | | | |
|---|---|---|---|
| 9,711,492 B2 | 7/2017 | Albers et al. | |
| 10,525,690 B2 | 1/2020 | Wang et al. | |
| 10,809,328 B2 | 10/2020 | Wang et al. | |
| 2010/0000334 A1* | 1/2010 | Katsurada | G01F 1/849 |
| | | | 73/861.357 |
| 2016/0358897 A1 | 12/2016 | Albers et al. | |
| 2017/0261358 A1* | 9/2017 | Cham | G01F 1/588 |
| 2019/0001437 A1* | 1/2019 | Mathisen | B23K 26/348 |
| 2023/0304843 A1* | 9/2023 | Lupienski | G01F 1/8422 |

FOREIGN PATENT DOCUMENTS

| | | | |
|---|---|---|---|
| EP | 3916783 | A2 | 12/2021 |
| WO | 2004083785 | A2 | 9/2004 |
| WO | 2022/031328 | A1 | 2/2022 |

* cited by examiner 1,3
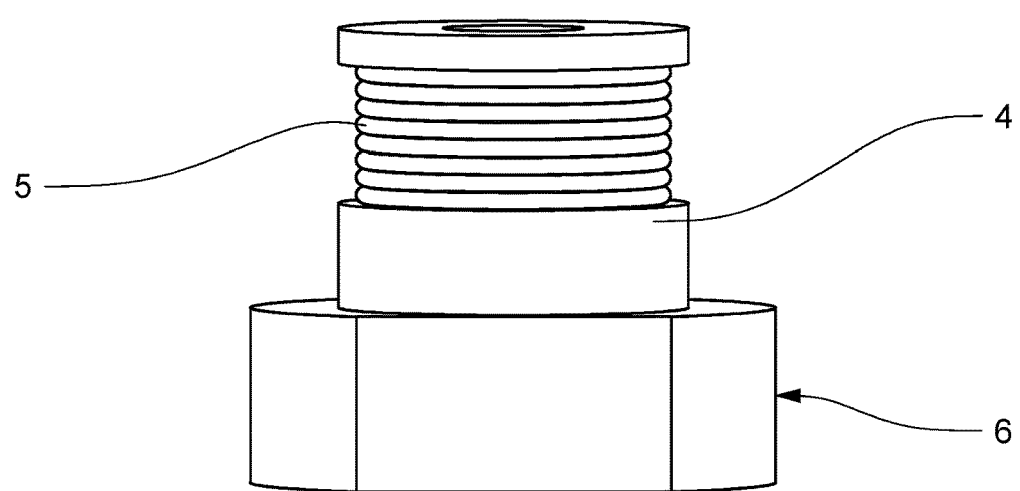
5
4
6
Fig. 1
1,3
5
4
6
7,10
11
8　　6　　25
Fig. 2

1,3

6

17

4

1,3

6 25

5

17

11

9

7,10

8

6

COIL ARRANGEMENT FOR A FLOWMETER AND METHOD OF MANUFACTURING A COIL ARRANGEMENT

TECHNICAL FIELD

The invention relates to a coil arrangement for a flowmeter, in particular for a Coriolis flowmeter or for a magnetic-inductive flowmeter, having a coil, wherein the coil has a coil body and has at least one coil winding made of an electrically conductive material. In addition, the invention relates to a flowmeter having a coil arrangement and a method of making such a coil assembly.

BACKGROUND

Coil arrangements are indispensable components of, in particular, Coriolis flowmeters and magnetic-inductive flowmeters. In Coriolis flowmeters, for example, coil arrangements are used as actuators to excite the measuring tubes to oscillation. In magnetic-inductive flowmeters, coil arrangements are needed to generate a magnetic field passing through the measuring tube.

A variety of coil arrangements are known from the prior art. The coil arrangements generally have a coil body on which at least one, but regularly several, coil windings of an electrically conductive material are wound. Current flows through the coil windings. If there are several coil windings, these are electrically insulated from each other to prevent a short circuit in the coil arrangement. Usually, a copper wire is used for the coil windings. It is known from the prior art to manufacture the coil bodies from different materials. For example, these can be made of a plastic. However, coil bodies made of ceramics are particularly suitable for high-temperature applications. Ceramics are much more insensitive to temperature than plastics, so that even measurement environments with more than 400° C. are no problem for the coil bodies. In addition, ceramics are suitable because of their electrical insulation properties.

It is known from the prior art to produce ceramic coil bodies by means of an injection molding process. For this, a liquid ceramic is poured into a corresponding mold and cured. The disadvantage of this process is that the shape of the coil body, in particular the fineness of the coil body contour, depends on the quality of the mold. In addition, such an injection molding process is elaborate.

SUMMARY

Accordingly, the object of the invention is to provide a coil arrangement which is advantageously designed compared to coil arrangements known from the prior art. A further object of the invention is to provide a simplified method for producing a coil arrangement compared with the prior art.

In the coil arrangement according to the invention, the object is initially and essentially achieved, namely with the features of the characterizing portion of the disclosure, in that the coil body is made from a ceramic material and that the coil body is produced by means of an additive manufacturing process.

According to the invention, it has been recognized that ceramic coil bodies implemented by means of additive manufacturing processes have considerable advantages over ceramic coil bodies known from the prior art. Additive manufacturing processes allow a significantly more filigree implementation of a structure than injection molding processes do. Accordingly, the coil bodies of the coil arrangements according to the invention can have a significantly finer structure than the coil bodies known from the prior art. Moreover, the coil bodies of coil arrangements according to the invention are suitable for high-temperature applications due to the ceramic used.

Particularly preferably, the additive manufacturing process is implemented by stereolithography, sinther lithography or another 3D printing process known from the prior art.

Additive manufacturing can readily be used to implement various structures, in particular in the interior of the coil body. A particularly preferred design of the coil arrangement according to the invention is characterized in that the coil body is at least partially hollow in its interior bounded by the coil body walls. In one variation, this is implemented in that the material in the interior of the coil body is at least partially arranged in an irregular structure. In a further variation, the material in the interior of the coil body is arranged at least partially in a regular structure. In particular, the coil body may also have regions in which the material is arranged in an irregular structure and may have further regions in which the material is arranged in a regular structure.

When reference is made to an irregular structure, it is meant that the structure has no periodicity and also that no order is found in the structure. An example of an irregular structure is a sponge-like or porous structure. Thus, for example, the material of the coil body may have a predetermined porosity. In this case, the material can have an open porosity, i.e., have hollow spaces that are connected with each other. However, the material may also have, for example, a closed porosity, i.e., hollow spaces that are not connected with each other. The material may also have regions of open porosity and regions of closed porosity simultaneously. Overall, the hollow spaces in the material are randomly or statistically distributed, so that an irregular structure is present.

When talking about a regular structure, it is meant that there is an order to be found in the structure, in particular that the structure has a periodicity. For example, a regular structure can be implemented by the juxtaposition of polyhedra. So, for example, a regular structure can be implemented by lining up cubes or by lining up pyramids or prisms. Any polyhedron that can be lined up without gaps is conceivable and thus implements a complete space filling. In particular, several different spatial bodies can also be used. Preferably, the polyhedra are hollow from the inside. A further regular structure can be implemented by taking a two-dimensional basic structure as a basis, which is then raised in the third spatial direction, for example a honeycomb structure which is raised to form hollow columns. Any oblique-angled, rectangular, hexagonal or square basic structure is suitable as a two-dimensional basic structure, for example. Such coil bodies therefore have a column structure inside, at least in certain areas.

Preferably, a regular structure can also be implemented by ribs formed in the coil body, i.e. the coil body thus has a rib structure in its interior at least in certain areas.

In a further preferred design, the coil body has a grid structure in its interior at least in regions. A lattice structure is implemented in that cross-pieces of the ceramic material are arranged in a lattice-like manner and are connected to one another. The underlying grid can be of any design, for example as a honeycomb grid or as a cubic grid.

In a further preferred design, the coil body is completely hollow from the inside.

According to the invention, it is thus possible to implement ceramic coil bodies which have significantly less material for the same size than coil bodies produced by injection molding. On the one hand, this results in a significantly lighter design, and on the other hand, the coil bodies can be manufactured at significantly lower cost due to the material savings.

In particular, when the coil bodies are used for Coriolis flowmeters, a significantly lighter coil arrangement enables the oscillation behavior of the measuring tubes to be influenced to a lesser extent.

A particularly preferred design, which can be implemented additionally or alternatively, is characterized in that the coil body has at least one back taper. This can be easily implemented due to manufacturing by means of an additive manufacturing process. Particularly preferably, the at least one coil winding is arranged at least partially in the back taper. Further preferably, the at least one coil winding is arranged completely in the back taper.

In order to protect the coil arrangement and in particular the at least one coil winding from external influences, a particularly preferred design of the coil arrangement is characterized in that the coil arrangement has a sheathing at least partially closing of the exterior. Very particularly preferably, the sheathing completely encloses at least the at least one coil winding, so that there is no connection to the exterior. Such a coil winding is protected, in particular, from dust or other media present in the exterior. In addition, the coil windings are likewise protected from damage by external influences by the sheathing. Such a design, in which the sheathing completely encloses the at least one coil winding, enables, for example, the coil arrangement to be used in areas subject to explosion protection.

Further preferably, the sheathing is also made of a ceramic material. As a result, the sheathing also exhibits low temperature sensitivity. In a particularly preferred design, the sheathing is produced by means of an additive manufacturing process. Further preferably, the sheathing is formed integrally with the coil body. In such a design, both the coil body and the sheathing are produced simultaneously by means of the same additive manufacturing process. In particular, it also makes sense in the case of a design that is not one piece that the same additive manufacturing process is used to produce the sheathing and the coil body.

In order to fasten the coil arrangement to a component of the flowmeter, it is provided in a particularly preferred design that the coil arrangement has a fastening element for fastening the coil arrangement. Particularly preferably, this fastening element is also made of a ceramic material and is produced by means of an additive manufacturing process. Such an embodiment is particularly advantageous, since thermal insulation to the component of the flowmeter can be implemented due to the ceramic material. If the fastening element is designed, for example, for fastening the coil arrangement to a Coriolis measuring tube, a high-temperature medium can flow through the measuring tube without having a detrimental effect on the coil arrangement.

Particularly preferably, the fastening element is formed integrally with the coil body. Further preferably, the coil body and the fastening element are thus manufactured in a single process step. In a further preferred design, provided that a sheathing is provided which sheaths the coil body, the fastening element may also be attached to this sheathing or be formed integrally with the sheathing. Such a design, in which the fastening element is integrally formed with the coil body and/or with the sheathing, reduces the number of necessary components and also allows easier mounting of the coil arrangement in or on the flowmeter.

A further design of the coil arrangement according to the invention is characterized in that the at least one coil winding is produced by an additive manufacturing process. In particular, the at least one coil winding is made of an electrically conductive ceramic. Such a design enables complete manufacture of the coil arrangement by means of additive manufacturing technology. Such a design has the advantage that both the at least one coil winding and the coil body have the same or at least similar coefficients of thermal expansion, and significantly lower material stresses occur when the temperature of the coil arrangement changes than is the case when entirely different materials are used.

In addition to the coil arrangement, the invention also relates to a flowmeter for determining the flow rate of a medium. The flowmeter has a coil arrangement, wherein the coil arrangement has a coil body and at least one coil winding made of an electrically conductive material. In the flowmeter, the object is achieved in that the coil body is made of a ceramic material and that the coil body is produced by means of an additive manufacturing process.

In further designs of the flowmeter according to the invention, the coil arrangement is implemented according to at least one of the designs explained in connection with the coil arrangement according to the invention. Accordingly, all explanations and designs made in connection with the coil arrangement according to the invention with their respective advantages apply accordingly to the flowmeter according to the invention. Particularly preferably, the flowmeter is a Coriolis flowmeter or a magnetic-inductive flowmeter.

In addition to the coil arrangement and the flowmeter, the invention also relates to a method for manufacturing a coil arrangement for a flowmeter, wherein the coil arrangement comprises a coil body and at least one coil winding made of an electrically conductive material. The method according to the invention is initially characterized in that, in a provisioning step, a 3D model of at least the coil body is provided. For further manufacturing, the method according to the invention comprises two alternative variations. In the first variation according to the invention, the coil former is manufactured from a ceramic material by means of an additive manufacturing process using the 3D model in a coil body printing step and the at least one coil winding is arranged around the coil body in a winding step. Thus, first the coil body is printed and then the coil winding is arranged around the coil body. This can be done, for example, by wrapping or by "pinning" the coil winding.

In the alternative variation, the at least one coil winding is first provided in a coil winding provisioning step. The coil winding can, for example, be wound around a provisional coil body and this provisional coil body is removed again, so that only the coil winding remains. Subsequently, in a coil body printing step, the coil body is printed at least partially into the inner region of the provided coil winding by means of an additive manufacturing process using the 3D model made of a ceramic material, in such a way that the provided coil winding is arranged around the printed coil body.

The method according to the invention allows particularly advantageous coil arrangements to be produced in a simplified manner. The use of an additive manufacturing process using a ceramic material enables the implementation of coil arrangements suitable for high temperatures, which preferably have a fine structure. In particular, the method according to the invention enables a reduction of the required material compared to methods for manufacturing coil assemblies known from the prior art, for example compared to injection molding processes.

A particularly preferred design of the method according to the invention is characterized in that the coil body printing step is divided into at least a first partial coil body printing step and a second partial coil body printing step. In the first partial coil body printing step, a first coil body part is manufactured. According to the invention, it is further provided that then, in the winding step, the at least one coil body winding is arranged around the first coil body part. In the second coil body part printing step, the second coil body part is manufactured. Particularly advantageously, this is done in such a way that the second coil body part is formed integrally with the first coil body part.

In a particularly preferred design, a 3D model of the coil body is provided in the provisioning step, in which the coil body is at least partially hollow in its interior. This is implemented by arranging the material inside the coil body at least partially in an irregular structure and/or arranging it at least partially in a regular structure. Thus, it is possible to increase material savings and to manufacture significantly lighter coil arrangements compared to coil arrangements that have a solid coil body. By using an additive manufacturing process, the structures according to the invention can be easily manufactured.

As explained in connection with the coil arrangement according to the invention, in a particularly preferred variation of the coil arrangement, it is provided that the at least one coil winding is also implemented by means of an additive manufacturing process. Accordingly, a particularly preferred design of the method according to the invention is characterized in that a 3D model of the at least one coil winding is provided in a coil winding model provisioning step and that the at least one coil winding is manufactured from an electrically conductive material by means of an additive manufacturing process on the basis of the 3D model in a coil winding printing step. Particularly preferably, an electrically conductive ceramic is used. This has the particular advantage that the coefficients of thermal expansion of the at least one coil winding and the coil body are essentially the same, so that no or only low mechanical stresses are to be expected in the event of a temperature change.

A further preferred design of the coil arrangement according to the invention has a sheathing at least partially closing off the exterior. A further development of the method according to the invention for producing such a coil arrangement is characterized accordingly in that, in a third provisioning step, a 3D model of the sheathing is provided and that, in a sheathing printing step, the sheathing is produced from a ceramic material by means of an additive manufacturing process on the basis of the 3D model.

Particularly preferably, the coil body printing step and the sheathing printing step are carried out simultaneously. In particular, the coil body and the sheathing are integrally formed.

As described further above, another preferred design of the coil arrangement comprises at least one fastening element for fastening the coil arrangement to a component of a flowmeter. A particularly preferred design of the method according to the invention is characterized in that, in a fourth provisioning step, a 3D model of the fastening element is provided, and in a fastening element printing step, the fastening element is manufactured from a ceramic material by means of an additive manufacturing process using the 3D model. Particularly preferably, the fastening element printing step and the coil body printing step and/or the sheathing printing step are carried out simultaneously, in particular in such a way that the fastening element and the coil body and/or the sheathing are integrally formed.

All explanations made in connection with the coil arrangement according to the invention can be transferred analogously to the method according to the invention and apply accordingly.

BRIEF DESCRIPTION OF THE DRAWINGS

In detail, there are now various possibilities for designing and further developing the coil arrangement according to the invention, the flowmeter according to the invention and the method according to the invention. In this regard, reference is made to the following description of preferred embodiments in conjunction with the drawings.

FIG. 1 illustrates a first embodiment of a coil arrangement.

FIG. 2 illustrates a second embodiment of a coil arrangement.

DETAILED DESCRIPTION

Figure 7:
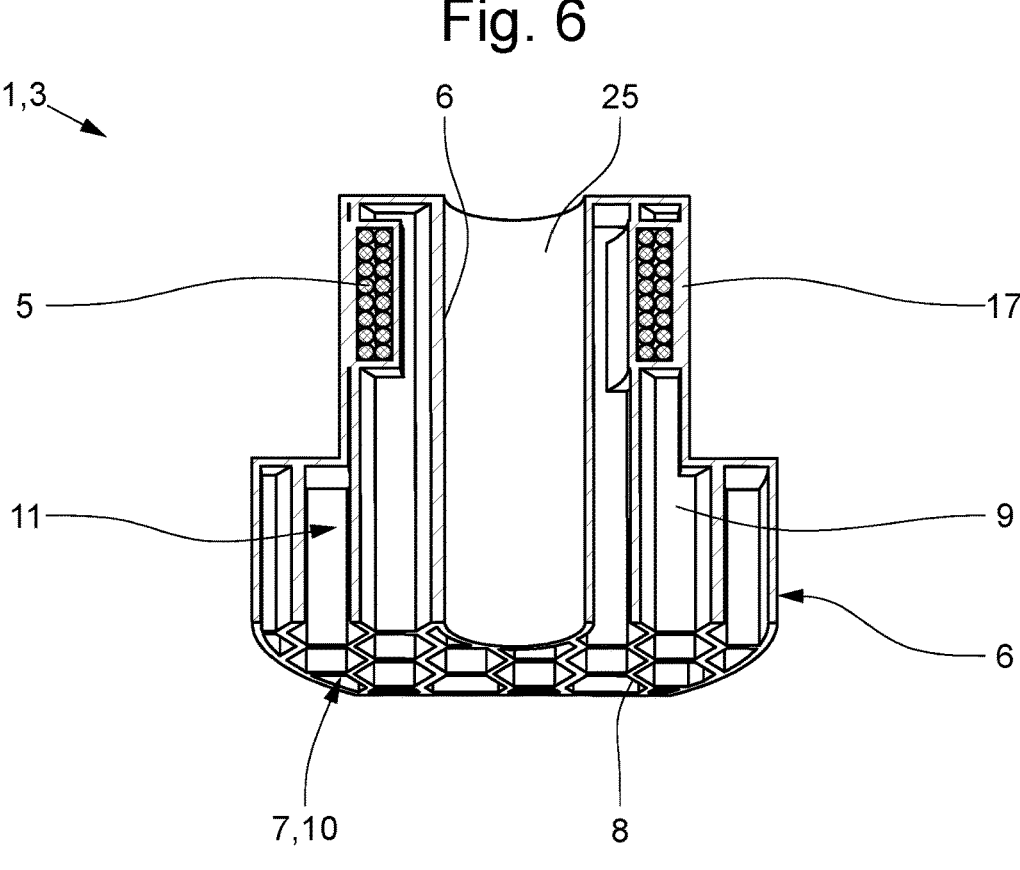
FIG. 7 illustrates a seventh embodiment of a coil arrangement.
Figures 8, 9:
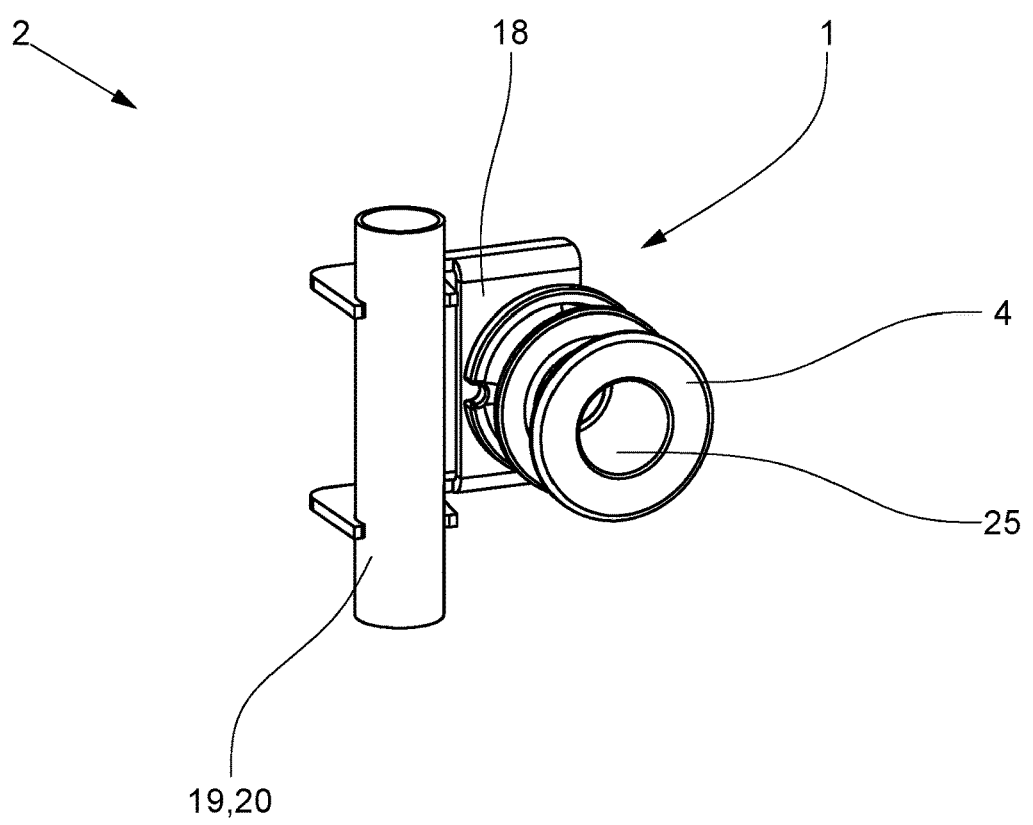
FIG. 8 illustrates a section of a flowmeter with a coil arrangement.
FIG. 9 illustrates a section of a flowmeter with another coil arrangement.

FIG. 1 shows a first design of a coil arrangement 1 for a flowmeter 2, wherein a flowmeter 2 is shown in parts in FIGS. 7 and 8. The coil arrangement 1 comprises a coil 3 having a coil body 4 and at least one coil winding 5 made of an electrically conductive material. In the illustrated design, the coil 3 has a plurality of coil windings 5 made of copper. The coil body 4 is made of a ceramic material. Moreover, the coil body 4 is manufactured by means of an additive manufacturing process, presently by means of stereolithography. In the illustrated design, the coil body 4 is formed in its interior 11 bounded by the coil body walls 6 in such a way that the material in the interior 11 of the coil body 4 is arranged in an irregular structure. This is presently implemented by the coil body 4 having both regions with an open porosity and regions with a closed porosity. By manufacturing by means of the additive manufacturing process, the implementation of such structures in the interior 11 of the coil body 4 is readily possible. In this way, material can be saved in particular, so that the coil bodies 4 and thus the coil arrangements 1 can be manufactured more cost-effectively.

In addition, such coil arrangements 1 have a reduced weight compared to coil arrangements 1 with solid coil bodies 4.

FIG. 2 shows a second design of a coil arrangement 1, which also has a coil 3. The coil body 2 shown in FIG. 2 is also made of a ceramic material and has been produced by means of an additive manufacturing process, in this case by means of sinter lithography. In contrast to the design shown in FIG. 1, the coil body 4 does not have an irregular structure in its interior 11 bounded by the coil body walls 6, but has a regular structure 7. The regular structure 7 is based on a two-dimensional honeycomb lattice 8, which is then raised in the third spatial direction to form columns 9. Overall, therefore, the regular structure 7 is presently implemented by a column structure 10.

Figures 3, 4:
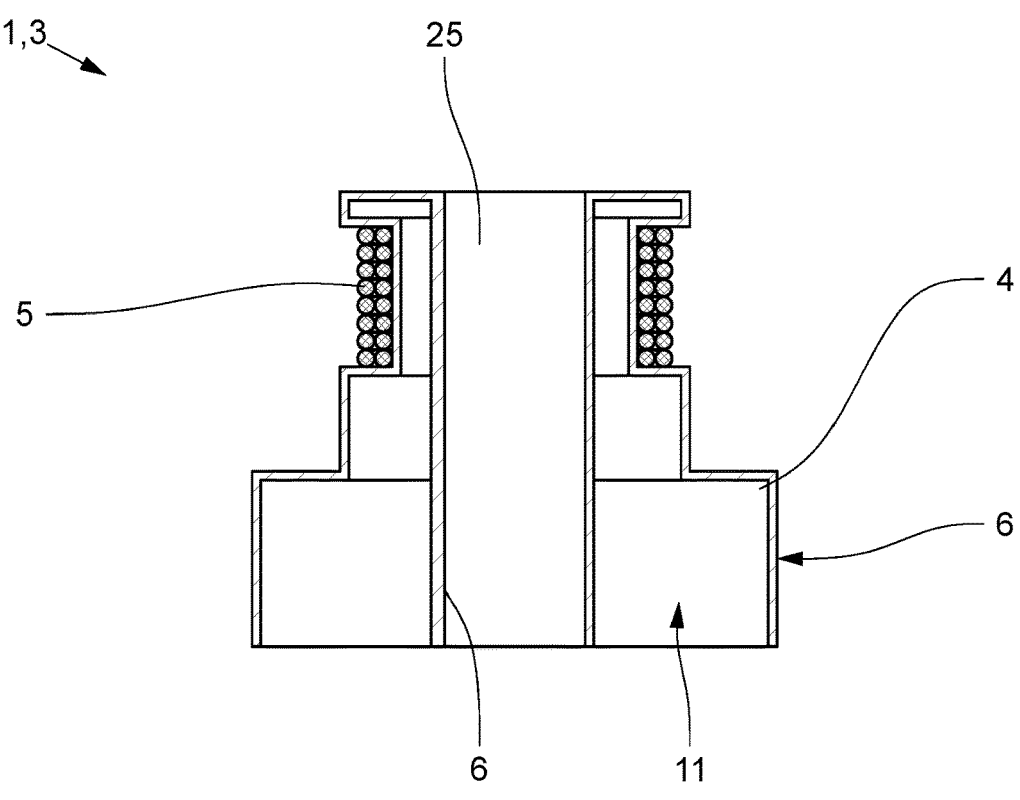
FIG. 3 illustrates a third embodiment of a coil arrangement.
FIG. 4 illustrates a fourth embodiment of a coil arrangement.

All coil bodies 4 shown in the figures are manufactured by means of an additive manufacturing process and consist of a ceramic material. A further design of a coil arrangement 1 is shown in FIG. 3. In this design, the coil body 4 is hollow from the inside. Accordingly, no ceramic material is arranged in the interior space 11 bounded by the coil body walls 6. The coil windings 5 are made of copper and wound around the ceramic coil body 4.

Figure 5A:
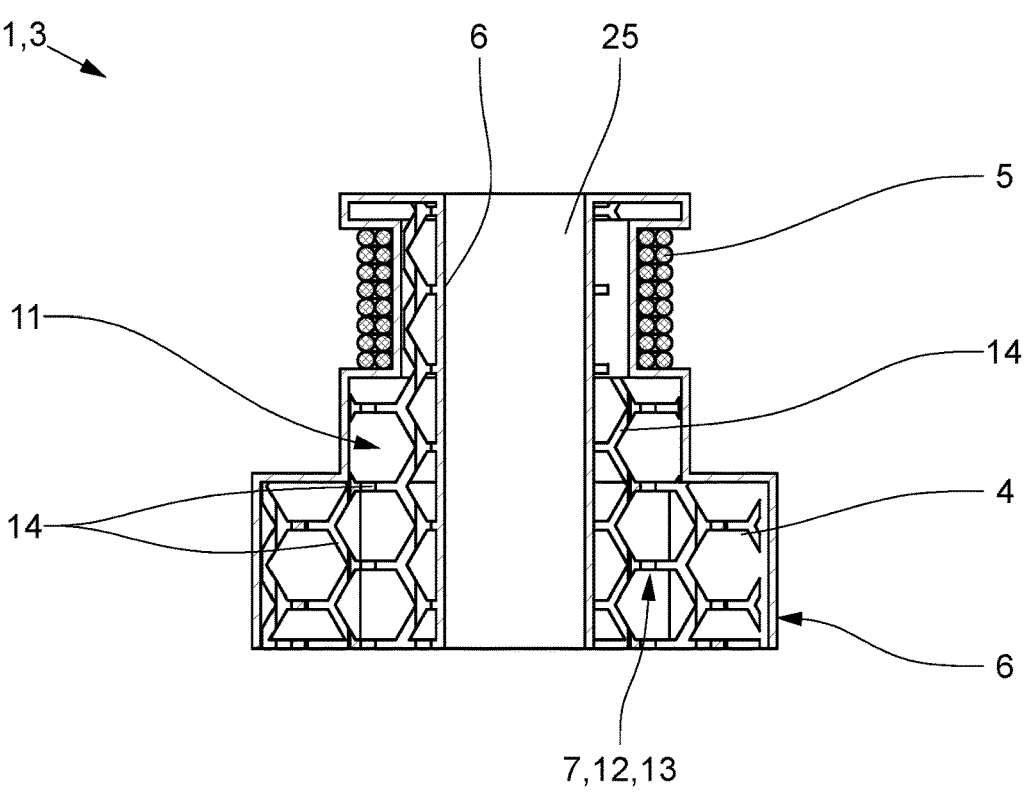
FIG. 5a illustrates a first representation of a fifth embodiment of a coil arrangement.
Figure 5B:
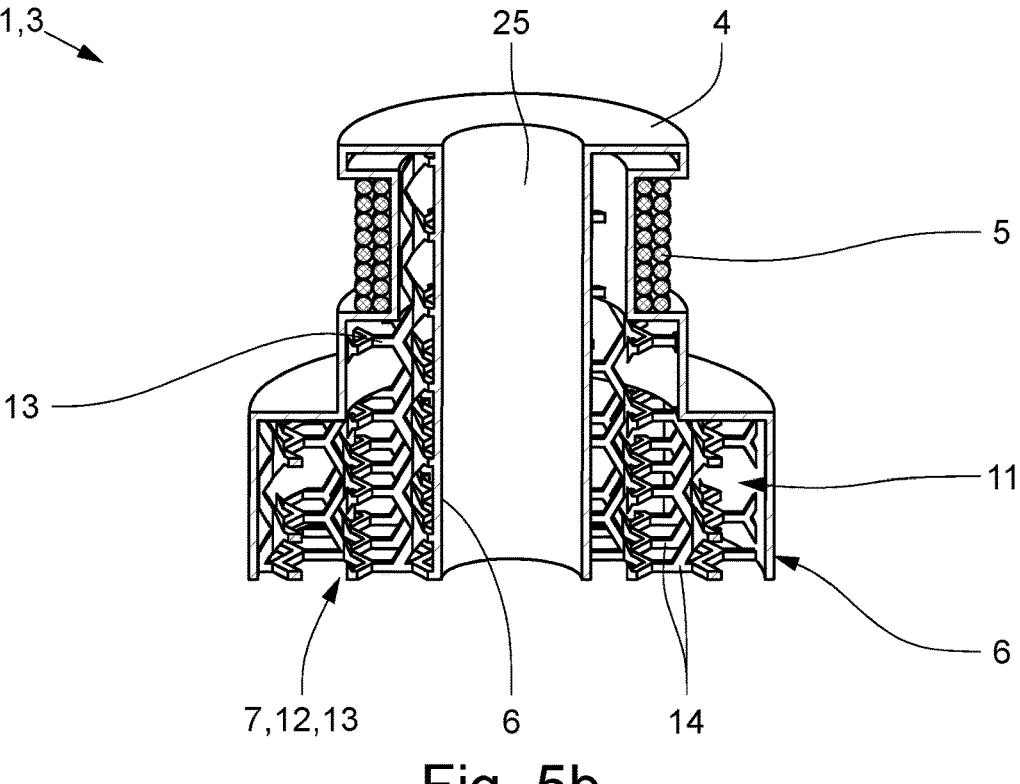
FIG. 5b illustrates a second representation of a fifth embodiment of a coil arrangement.

FIGS. 5*a* and 5*b* show a design in which the regular structure 7 in the interior 11 of the ceramic coil body 4 is implemented by a lattice structure 12. In the present embodiment, a three-dimensional honeycomb lattice 13 is implemented by cross-pieces 14 connecting the lattice points of the honeycomb lattice 13. In such a design, the required material is further reduced. Due to the lattice structure 12, the coil body 4 nevertheless exhibits sufficient mechanical stability.

A further design of a coil arrangement 1 is shown in FIG. 4. The interior 11 of the coil arrangement 1 shown here is identical to the design shown in FIG. 2, i.e. it has a regular structure 7 in the form of a column structure 10. In contrast to the design shown in FIG. 2, the design shown in FIG. 4 has a back taper 15 in which the coil windings 5 are at least partially arranged. The implementation of a back taper 15 in the ceramic coil body 4 is readily possible due to the manufacture of the coil body 4 by means of an additive manufacturing process. Due to the fact that the coil windings 5 are at least partially arranged in the back taper 15, the back taper 15 forms a protection against the exterior 16 of the coil arrangement 1.

Figure 6:
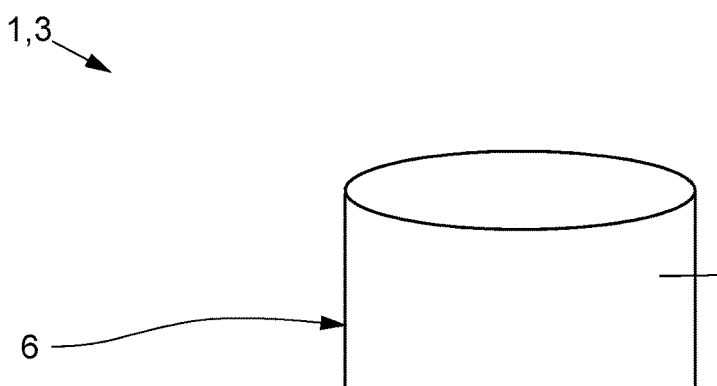
FIG. 6 illustrates a sixth embodiment of a coil arrangement.

In addition to the coil body 4 and the coil windings 5, which are not visible, the coil arrangement 1 shown in FIG. 6 has a sheathing 17. Both the coil body 4 and the sheathing 17 are made of a ceramic material and by means of additive manufacturing. The sheathing 17 is arranged in the region of the coil windings 5 and thus forms a closure to the exterior 16. The coil windings 5 are completely insulated from the exterior 16 by the sheathing 17. In addition, the coil body 4 is solid in its interior 11.

FIG. 7 also shows a representation of a coil arrangement which also has a sheathing 17 like the coil arrangement shown in FIG. 6. FIG. 7 shows a cross-section through the coil arrangement 1, so that it can be seen particularly well in FIG. 7 that the sheathing 17 is formed integrally with the coil body 4 and, moreover, completely delimits the coil windings 5 from the exterior 16. Such a coil arrangement 1 can be implemented particularly advantageously due to additive manufacturing.

FIGS. 8 and 9 each show a section of a flowmeter 2 with a coil arrangement 1. In both embodiments shown, the coil arrangements 1 have a fastening element 18 for fastening the coil arrangements 1 to a component 19 of the flowmeter 2. Presently, in both embodiments, the coil arrangements 1 are attached to the measuring tube 20 of the flowmeter 2, presently a Coriolis flowmeter. In both embodiments shown, the fastening element 18 is made of a ceramic material and is also manufactured by means of an additive manufacturing process. In the embodiment shown in FIG. 8, the fastening element 18 is integrally formed with the coil body 4. In particular, the fastening element 18 and the coil body 4 have been additively manufactured in a common printing step.

In contrast, the fastening element 18 of the design shown in FIG. 9 is implemented as a separate component. The coil body 4 and the fastening element 18 are connected to each other by additional connecting means 21. In the present embodiment, this is implemented in such a way that the fastening element 18 has a recess 22 through which a connecting rod 23 connected to the coil body is passed. A nut 24, which is screwed onto the connecting rod 23, fixes the coil body 4 and the connecting element 18 relative to each other.

In most figures, the coil body 4 has a channel 25 for guiding electrical connections.

The coil arrangement 1 shown in FIG. 6 has a further special feature. The at least one coil winding 5, which is arranged behind the sheathing 17 and is accordingly not visible, is made of an electrically conductive ceramic and has also been manufactured by means of an additive manufacturing process.

Figure 10A:
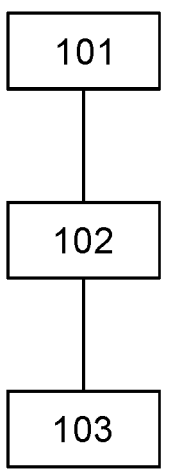
FIG. 10a illustrates a block diagram of a first variation of a first method for manufacturing a coil arrangement.

FIG. 10*a* shows a block diagram of a first variation of a first method 100 for manufacturing a coil arrangement, such as shown in FIG. 1. In a provisioning step 101, a 3D model of at least the coil body is provided. In a coil body printing step 102, the coil body is manufactured from a ceramic material using an additive manufacturing process based on the 3D model, and in a winding step 103, the at least one coil winding is arranged around the coil body. In the illustrated design of the method 100, a 3D model of the coil body is provided in the provisioning step 101, in which the coil body is at least partially hollow in its interior, in that the material in the interior of the coil body is at least partially arranged in an irregular structure.

Figure 10B:
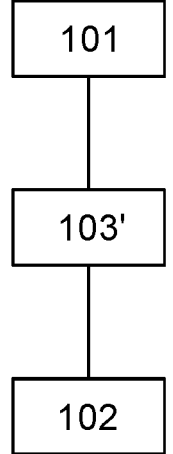
FIG. 10b illustrates a block diagram of a second variation of a first method for manufacturing a coil arrangement.

FIG. 10*b* shows a block diagram of a second variation of a first method 100 for manufacturing a coil assembly as shown in FIG. 1. In the second variation, a 3D model of at least the coil body is also first provided in a provisioning step 101. In contrast to the first variation, the at least one coil winding is now provided in a coil winding provisioning step 103'. Subsequently, in a coil body printing step (102), the coil body is printed at least partially into the inner region of the provided coil winding by means of an additive manufacturing process using the 3D model made of a ceramic material. This is done in such a way that the provided coil winding is arranged around the printed coil body.

Figure 11:
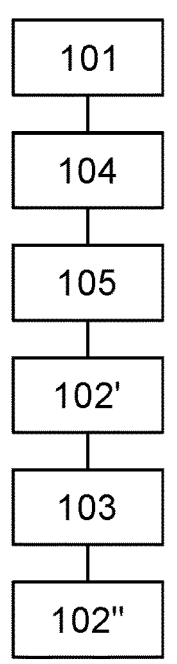
FIG. 11 illustrates a block diagram of a second method for manufacturing a coil arrangement.

FIG. 11 shows a second design of a method 100' for manufacturing a coil arrangement. In the illustrated design, a 3D model of the coil body is also provided in a provisioning step 100. In contrast to the design of FIG. 10, a 3D model of the coil body is provided in the provisioning step 101, in which the coil body is at least partially hollow in its interior, in that the material in the interior of the coil body is at least partially arranged in a regular structure. In a coil winding provisioning step 104, a 3D model of the at least one coil winding is provided. In a coil winding printing step 105, the at least one coil winding is manufactured from an electrically conductive material, presently from an electrically conductive ceramic, by means of an additive manufacturing process on the basis of the provided 3D model. Also in contrast to the design shown in FIG. 10, in the process 100' shown here the coil body printing step 102 is divided into at least a first partial printing step 102' and a second partial printing step 102". First, in the first partial printing step 102', a first coil body is manufactured. Subsequently, in the winding step 103, the at least one coil body winding is arranged around the first coil body part, and subsequently, in the second partial printing step 102", the second coil body part is manufactured. The first coil body part and the second coil body part are manufactured in such a way that they are integrally formed, i.e. are non-detachably connected to each other.

Figure 12:
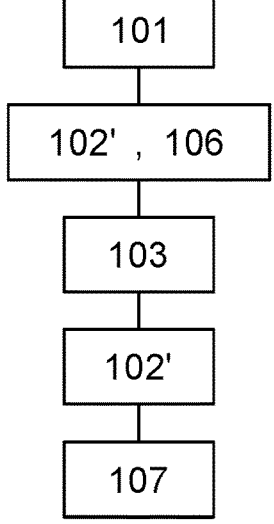
FIG. 12 illustrates a block diagram of a third method for manufacturing a coil arrangement.

FIG. 12 shows a block diagram of a method 100" for manufacturing a coil arrangement, wherein the coil arrangement comprises both a sheath at least partially closing the coil arrangement to the exterior and a fastening element for fastening the coil arrangement to a component of a flowmeter. In the provisioning step 101, in addition to the 3D model of the coil body, a 3D model of the sheathing and a 3D model of the fastening element are also provided. Subsequently, the first partial step 102' of the coil body printing step 102 is performed simultaneously with a sheathing printing step 106. In the sheathing printing step 106, the sheathing is produced by means of an additive manufacturing process, i.e. presently with the additive manufacturing process used for producing the coil body. This is done in such a way that at least the first coil body part and the sheathing are integrally formed. In a winding step 103, the coil windings are arranged around the first coil body part. Subsequently, the second partial step 102" of the coil body printing step 102 is carried out. In a fastening element printing step 107, the fastening element is manufactured from a ceramic material using an additive manufacturing process based on the 3D model. In the present case, the same process and the same material are used as for manufacturing the coil body and the sheathing. In the illustrated method, the fastening element printing step 107 is carried out independently. In another design not shown, the fastening element printing step 107, the coil body printing step 102 and the sheath printing step 106 are carried out simultaneously, such that the fastening element, the coil body and the sheath are integrally formed.

The invention claimed is:

1. A coil arrangement for a flowmeter, comprising:
    a coil;
    wherein the coil has a coil body and has at least one coil winding made of an electrically conductive material;
    wherein the coil body is made of a ceramic material;
    wherein the coil body is produced by an additive manufacturing process;
    wherein the coil body is at least partially hollow in an interior bounded by coil body walls;
    wherein the material in the interior of the coil body is at least partially arranged in at least one of an irregular structure and a regular structure; and
    wherein the material in the interior of the coil body that is at least partially arranged in at least one of an irregular structure and a regular structure is not part of the coil body walls.

2. The coil arrangement according to claim 1, wherein the coil body has at least partially in its interior at least one of an open porosity, a closed porosity, a column structure, a rib structure, and a lattice structure.

3. The coil arrangement according to claim 1, wherein the coil body has at least one back taper; and
    wherein the at least one coil winding is arranged at least partially in the back taper.

4. The coil arrangement according to claim 1, wherein the coil arrangement has a sheathing at least partially closing off the exterior.

5. The coil arrangement according to claim 1, wherein the coil arrangement has a fastening element for fastening the coil arrangement to a component of a flowmeter.

6. The coil arrangement according to claim 1, wherein the at least one coil winding is produced by an additive manufacturing process; and
    wherein the at least one coil winding is produced from a conductive ceramic.

7. The coil arrangement according to claim 4, wherein the sheathing is made from a ceramic material and is produced by an additive manufacturing process.

8. The coil arrangement according to claim 7, wherein the sheathing is formed integrally with the coil body.

9. The coil arrangement according to claim 5, wherein the fastening element is made of a ceramic material and is produced by an additive manufacturing process.

10. The coil arrangement according to claim 9, wherein the fastening element is formed integrally with at least one of the coil body and, if a sheathing is provided, with the sheathing.

11. A flowmeter for determining the flow of a medium, comprising:
    a coil arrangement;
    wherein the coil arrangement has a coil, and the coil has a coil body and has at least one coil winding made of an electrically conductive material;
    wherein the coil body is made of a ceramic material and the coil body is manufactured by an additive manufacturing process;
    wherein the coil body is at least partially hollow in an interior bounded by coil body walls;
    wherein the material in the interior of the coil body is at least partially arranged in at least one of an irregular structure and a regular structure; and
    wherein the material in the interior of the coil body that is at least partially arranged in at least one of an irregular structure and a regular structure is not part of the coil body walls.

12. The flowmeter according to claim 11, wherein at least one of:
    the coil body has at least partially in its interior at least one of an open porosity, a closed porosity, a column structure, a rib structure, and a lattice structure;
    the coil body has at least one back taper, and the at least one coil winding is arranged at least partially in the back taper;
    the coil arrangement has a sheathing at least partially closing off the exterior, the sheathing is made from a ceramic material and is produced by an additive manufacturing process, and the sheathing is formed integrally with the coil body;
    the coil arrangement has a fastening element for fastening the coil arrangement to a component of a flowmeter, the fastening element is made of a ceramic material and is produced by an additive manufacturing process, and the fastening element is formed integrally with at least one of the coil body and, if a sheathing is provided, with the sheathing; and
    the at least one coil winding is produced by an additive manufacturing process, and the at least one coil winding is produced from a conductive ceramic.

13. A method for manufacturing a coil arrangement for a flowmeter, wherein the coil arrangement includes a coil body and at least one coil winding made of an electrically conductive material, the method comprising:

in a provisioning step, a 3D model of at least the coil body is provided;

in a coil body printing step, the coil body is manufactured from a ceramic material by an additive manufacturing process on the basis of the 3D model; and in a winding step, the at least one coil winding is arranged around the coil body; or in a coil winding provisioning step the at least one coil winding is provided and in a coil body printing step the coil body is printed by an additive manufacturing process on the basis of the 3D model from a ceramic material at least partially in an inner region of the provided coil winding, such that the provided coil winding is arranged around the printed coil body;

wherein in the provisioning step, a 3D model of the coil body is provided, in which the coil body is at least partially hollow in its interior;

wherein the material in the interior of the coil body is arranged at least partially in at least one of an irregular structure and a regular structure; and wherein the material in the interior of the coil body that is at least partially arranged in at least one of an irregular structure and a regular structure is not part of the coil body walls.

14. The method according to claim 13, wherein the coil body printing step is divided into at least a first partial printing step and a second partial printing step;

wherein in the first partial printing step a first coil body part is manufactured;

wherein, in the winding step, the at least one coil winding is arranged around the first coil body part; and wherein, in a second partial printing step, a second coil body part is produced, in such a way that it is formed integrally with the first coil body part.

15. The method according to claim 13, wherein in a coil winding model provisioning step, a 3D model of the at least one coil winding is provided; and wherein in a coil winding printing step the at least one coil winding is manufactured from an electrically conductive material by an additive manufacturing process using the 3D model.

16. The method according to claim 13, wherein the coil arrangement has a sheathing at least partially closing off the exterior, wherein a 3D model of the sheathing is provided in the provisioning step;

wherein, in a sheathing printing step, the sheathing is manufactured from a ceramic material by an additive manufacturing process using the 3D model.

17. The method according to claim 13, wherein the coil arrangement has at least one fastening element for fastening the coil arrangement to a component of a flowmeter;

wherein a 3D model of the fastening element is provided in the provisioning step;

wherein, in a fastening element printing step, the fastening element is manufactured from a ceramic material by an additive manufacturing process using the 3D model.

18. The method according to claim 17, wherein the fastening element printing step and the coil body printing step and/or the sheathing printing step are carried out simultaneously, in such a way that the fastening element and the coil body and/or the sheathing are implemented in one piece.

19. The method according to claim 13, wherein the coil arrangement has a sheathing at least partially closing off the exterior, wherein a 3D model of the sheathing is provided in the provisioning step;

wherein, in a sheathing printing step, the sheathing is manufactured from a ceramic material by an additive manufacturing process using the 3D model; and wherein the coil body printing step or at least a first partial printing step of the coil body printing step and the sheathing printing step are carried out simultaneously, in such a way that the coil body and the sheathing are implemented in one piece.

* * * * *